United States Patent [19]
Orain

[11] Patent Number: 5,957,615
[45] Date of Patent: Sep. 28, 1999

[54] SYSTEM FOR REMOVABLY AND MECHANICALLY LOCKING A SLEEVE ON A DRIVESHAFT

[75] Inventor: Michel Orain, Conflans Saint Honorine, France

[73] Assignee: GKN Automotive AG, Lohmar, United Kingdom

[21] Appl. No.: 08/936,070

[22] Filed: Sep. 23, 1997

[30] Foreign Application Priority Data

Sep. 24, 1996 [FR] France .................................. 96 11607

[51] Int. Cl.⁶ .................................................. B25G 3/28
[52] U.S. Cl. ...................... 403/359.1; 403/362; 403/298
[58] Field of Search .................................. 403/362, 359, 403/373, 374.1, 374.3, 379.1, 379.3, 379.4, 298

[56] References Cited

U.S. PATENT DOCUMENTS

| | | | |
|---|---|---|---|
| 4,915,523 | 4/1990 | Andersson | 403/362 X |
| 5,647,597 | 7/1997 | Grochowski | 403/359 X |

FOREIGN PATENT DOCUMENTS

| | | |
|---|---|---|
| 0088589A1 | 9/1983 | European Pat. Off. . |
| 2830198A1 | 1/1980 | Germany . |
| 596750 | 3/1979 | U.S.S.R. . |

*Primary Examiner*—Lynne Reichard
*Assistant Examiner*—David E. Bochna
*Attorney, Agent, or Firm*—Howard & Howard

[57] ABSTRACT

A system for removably and mechanically locking a sleeve on a driveshaft includes at least one peripheral groove comprising a bearing face on the driveshaft. At least one peripheral slot on the sleeve forms a chamber in the internal peripheral wall of the sleeve and includes a bearing face. At least one wedge-forming element can move more or less radially within the chamber between a position retracted inside the housing to allow the shaft to be slipped into the sleeve, and a position partially protruding from said chamber in which said element is designed to bear on the bearing face of the groove and on the bearing face of the chamber 34. Means for moving the movable wedge-forming element move the wedge-forming element radially inward, from outside the sleeve, in order to lock the sleeve on the shaft.

24 Claims, 7 Drawing Sheets

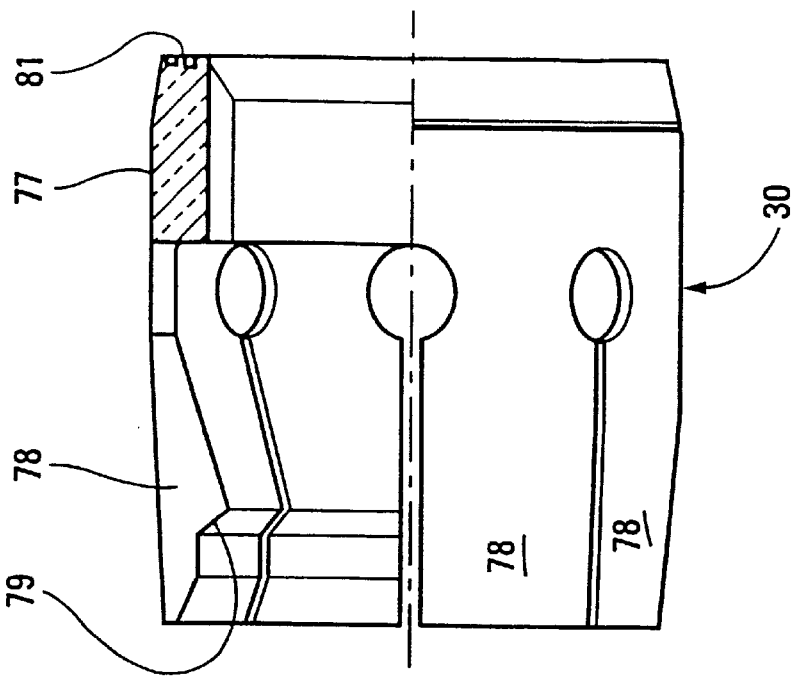
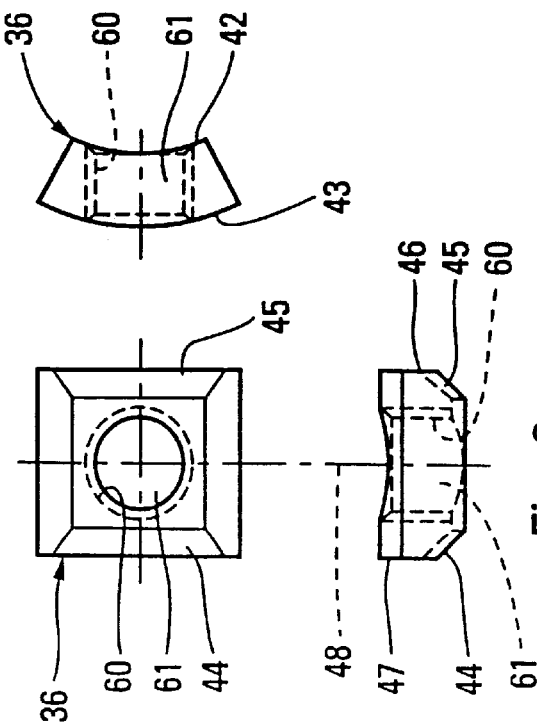
Fig. 12
Fig. 6b
Fig. 6a
Fig. 6c
Fig. 6d

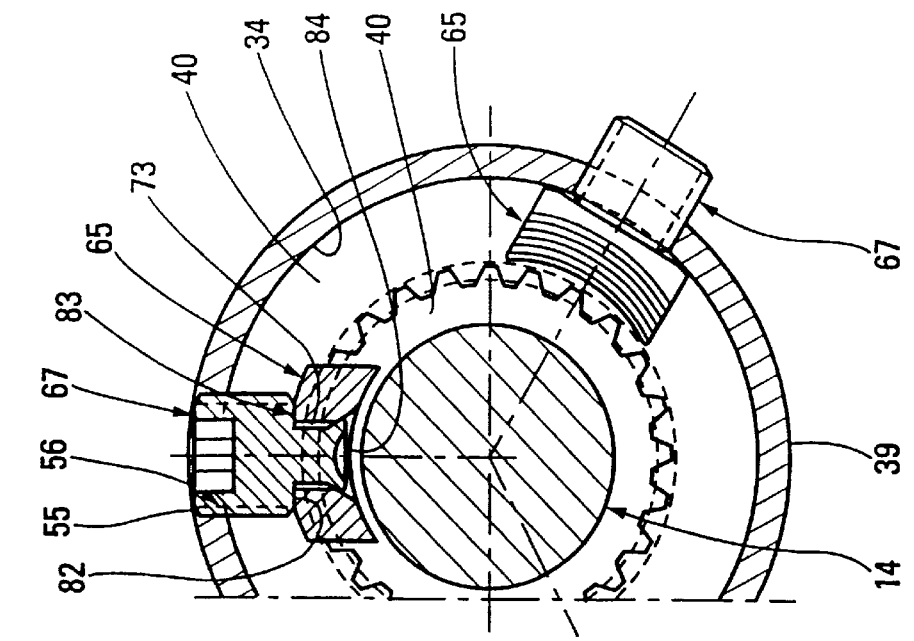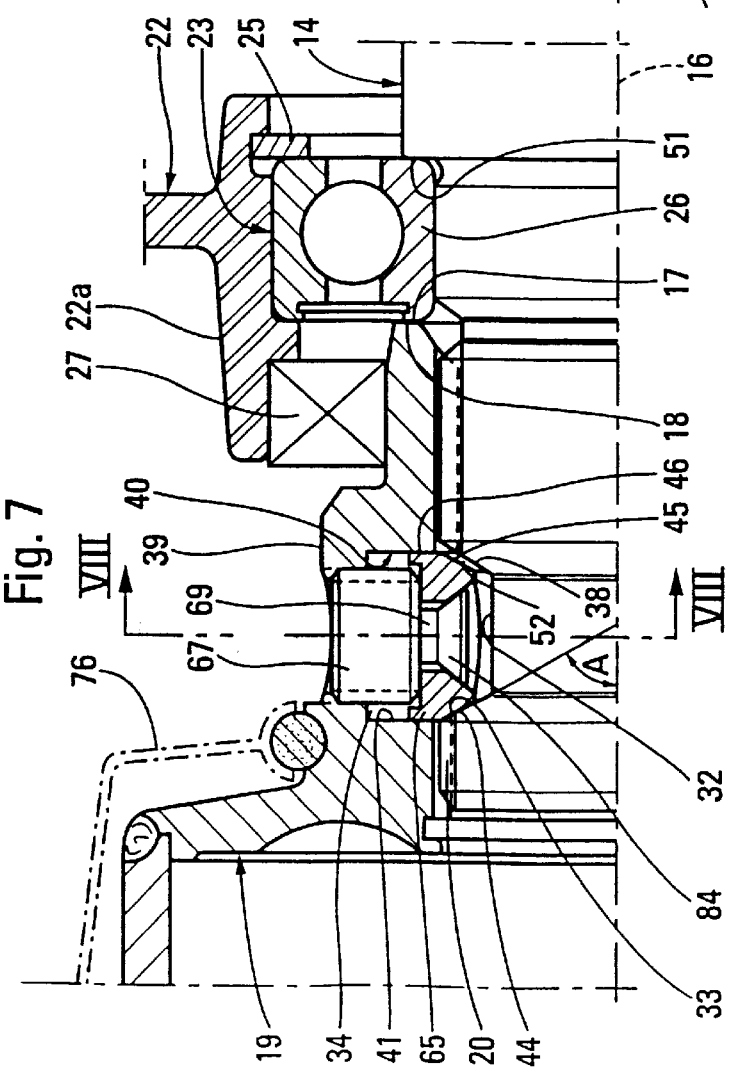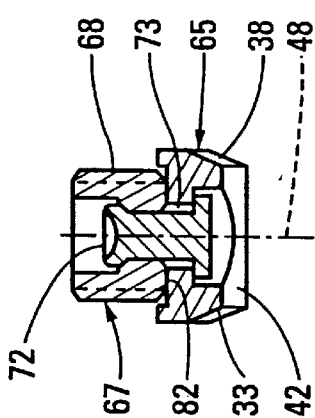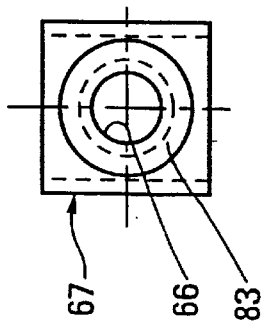

ced on the

SYSTEM FOR REMOVABLY AND MECHANICALLY LOCKING A SLEEVE ON A DRIVESHAFT

BACKGROUND OF THE INVENTION

The present invention relates to a system for removably and mechanically locking on a rotary drive shaft a sleeve which is designed to be slipped axially over said shaft and to be driven in rotation by said shaft, especially using splines.

In general, rotational drive to power take-off constant-velocity joints is via a conventional splined coupling, while the axial positioning of the sleeve of the joint on the shaft is achieved using a circlip or snap ring housed in complementary grooves formed respectively on the external surface of the shaft and on the internal surface of the sleeve; the constant-velocity joint which is immersed in lubricant, is hermetically sealed and the end of the shaft is inaccessible once the joint has been fitted.

The drawbacks of this type of fastening are known.

The clearances required between internal and external splines for assembling allow slight rotational and flexural oscillations of the joint on the shaft when the direction of torque is reversed as well as at low continuous torques because of vibration of the power unit. This may result in noise which is detrimental to comfort and in contact corrosion. This type of coupling cannot therefore be used for transmissions that run at a high rotational speed.

This type of fastening is incapable of axially locking the inner race of the output rolling bearing of the shaft in question, which means that this race has to be mounted on the shaft with a very tight diametral fit with small tolerances.

The joint is removed by pulling forcefully on the transmission in order to overcome the resistance of the snap ring and the friction. The snap ring therefore needs to be flexible enough that it moves aside radially during removal, but rigid enough to hold the joint in place during use. This particular feature involves the profile of the grooves being produced with great care.

Furthermore, upon assembly, it is impossible to check unequivocally that the snap ring has been fitted correctly in these housings, and therefore that assembly is reliable.

A conventional solution that allows these drawbacks to be overcome consists in inserting a flanged sleeve between the shaft and the constant-velocity joint, as depicted in FIG. 1. First of all, the sleeve 1, which has a flange 6, is fastened to the splined shaft 2 using a nut 3 which axially locks the sleeve 1 against the inner race 4 of the output bearing 5 through which the shaft 2 protrudes from the casing 7. The flange 6 is then fastened to the collar 8 of the constant-velocity joint 9 closed by the plug 10, by means of the bolts 11.

This assembly, which is satisfactory from the point of view of mechanical quality of the coupling, does, however, have the following drawbacks.

It appreciably increases the cost of machining for the coupling as a result of the addition of the flange 6, which is a bulky mechanical component, and increases the cost of assembly.

The diametral bulk of the constant-velocity joint and of the coupling is increased.

The overhang from the center of articulation of the joint relative to the bearing that guides the shaft is appreciably increased.

The mass of the connection also is increased.

SUMMARY OF THE INVENTION

The present invention relates particularly to a system for fixing and locking to a drive shaft a closed element such as a constant-velocity universal joint.

The present invention relates also to a sleeve, particularly a constant-velocity universal joint sleeve designed for use with the aforementioned system, as well as a constant-velocity universal joint comprising a sleeve of this type.

The present invention applies particularly to the fastening of constant-velocity universal joints to the end of power take-off shafts emerging from the casings of gearboxes, front or rear axle assemblies, transmission boxes and transfer boxes, etc.

The object of the present invention is to overcome the drawbacks of the aforementioned known solutions and to provide a simple, reliable, and economical system that is quick and easy to fit and to remove, capable of locking the constant-velocity universal joint and the inner race of the bearing placed at the exit of the casing in question forcefully on the drive shaft without leading to an increase in the axial and radial bulk or to an increase in cost as was the case in the prior art described hereinabove.

The system of the aforementioned type at which the invention is aimed comprises means designed to bear on the shaft in order to press the free end of the sleeve to be fastened axially against an element forming a stop integral with the shaft.

According to the invention, this system preferably comprises:

a) on the shaft, a predetermined distance away from the end face thereof, at least one peripheral groove comprising a bearing face;

b) on the sleeve, at least one internal peripheral slot forming a chamber formed in the internal peripheral wall of the sleeve and comprising a bearing face;

c) at least one wedge-forming element which can move more or less radially within the chamber between a position retracted inside the chamber to allow the shaft to be slipped into the sleeve and a position partially protruding from said chamber in which said element is designed to bear, via a first face, on the bearing face of the groove of the shaft and, via a second face, on the bearing face of the chamber of the sleeve;

d) means for making the movable wedge-forming element move radially in one direction or the other, from outside the sleeve;

e) the bearing faces being oriented respectively in such a way that a more or less radially inward movement of the wedge-forming element causes the sleeve to be locked on the shaft.

When the wedge-forming element is moved radially inward in the chamber, this element bears on the bearing face of the shaft in order to press the sleeve axially against the element that forms a stop.

The system according to the present invention thus makes it possible to combine the advantages of an assembly that uses a circlip or a snap ring (low cost and small bulk) with the advantages of a flanged sleeve (the sleeve and the inner race of the bearing can be locked unequivocally on the shaft), without displaying the drawbacks of these methods of assembly known from the prior art.

In a preferred version of the invention, the shaft comprises a peripheral groove which on the same side as the end face of the shaft has a tapering bearing face that widens toward the outside in the direction of said end face, and each wedge-forming element has a face designed to bear on said tapering face, and the bearing face of the chamber is perpendicular to the direction of the axis of the sleeve.

According to another aspect of the invention, the sleeve, especially the closed sleeve, and in particular the sleeve of a constant-velocity universal joint, is one which is designed for use with a system of the aforementioned type.

According to a third aspect of the invention, the constant-velocity universal joint according to the invention, which comprises a sleeve designed to be fixed to the end of a rotary driveshaft, is one which comprises a sleeve of the aforementioned type and which is mounted on the end of said shaft by means of a system of the aforementioned type.

Other features and advantages of the invention will become clear in the detailed description below.

The appended drawings are given purely by way of nonlimiting examples.

BRIEF DESCRIPTION OF THE DRAWINGS

FIGS. 6a, 6b and 6c are views respectively in plan, profile and elevation, of a key according to one embodiment of the system of the present invention.

FIG. 6d is an elevation view of a clamping screw that allows the key depicted in FIGS. 6a to 6c to be moved.

FIG. 7 is a view similar to FIG. 3 of another embodiment of the system according to the present invention.

FIG. 8 is a view in section taken along the lines VIII—VIII of FIG. 7.

FIG. 9 is a plan view of the key depicted in FIGS. 7 and 8.

FIGS. 10a, 10b, 10c are views in diametral section respectively depicting three ways of attaching the key of FIG. 9 to its locking screw.

FIG. 12 is an elevation view of the protective sleeve depicted in chain line in FIG. 2.

DETAILED DESCRIPTION OF THE PREFERRED EMBODIMENT

Figure 1:
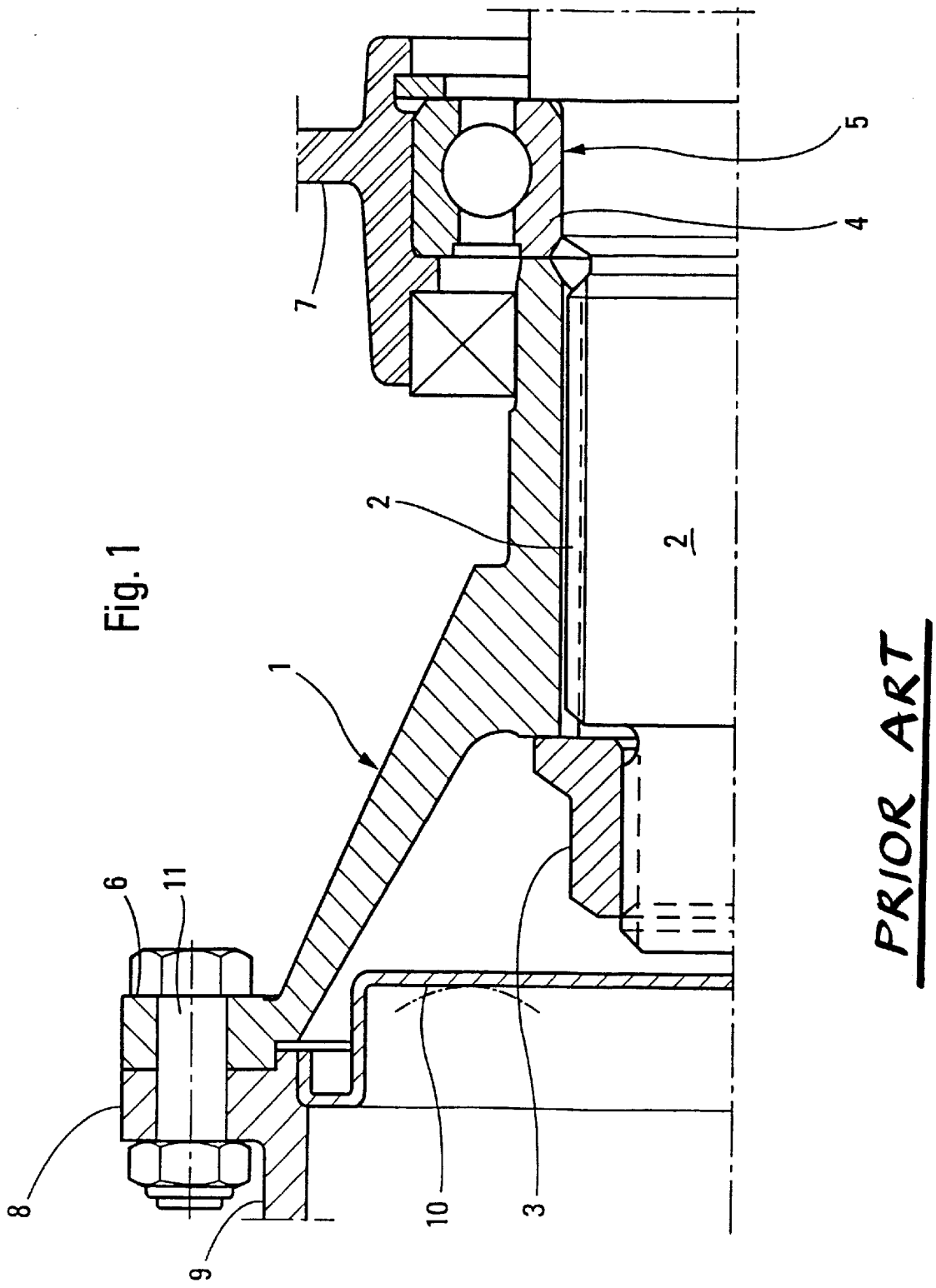
FIG. 1 is a half-view in longitudinal section of a system according to the prior art for fastening a constant-velocity joint to a stub of shaft.

In the embodiment depicted in FIGS. 2 to 6 a system 13 for removably and mechanically connecting a rotary driveshaft 14 and a sleeve 15, designed to be slipped over said shaft 14 in the direction of the axis 16 and to be driven in rotation by said shaft has been depicted.

This system 13 comprises means designed to bear on the shaft 14 in order to press the free end 17 of the sleeve 15 axially against an element forming a stop 18 integral with the shaft 14.

In this example, the sleeve 15 is the hub of a constant-velocity universal joint 19 intended to be fastened to the shaft 14. The shaft 14 on its external peripheral surface comprises splines 20 which complement splines 21 formed on the internal peripheral wall of the sleeve 15. The splined shaft 14 is a power take-off shaft which emerges from the casing 22 with respect to which it is guided by the rolling bearing 23, the outer race 24 of which is held in the casing 22 by a circlip 25. The element 18 forming a stop is the outer face of the inner race 26 of the bearing 23 which itself butts against the shoulder 51 of the shaft 14 (see later).

Figure 2:
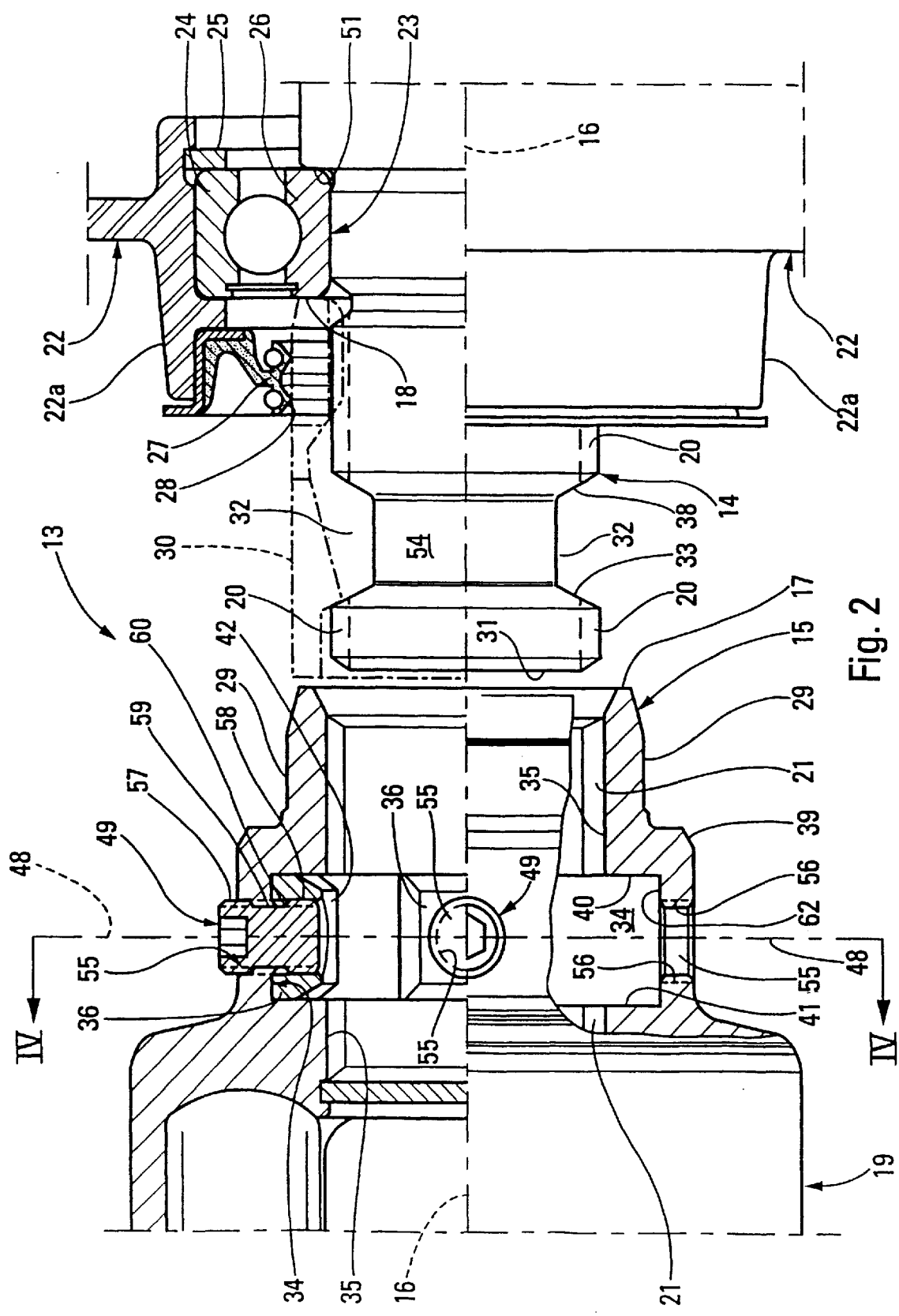
FIG. 2 is a view in longitudinal section of one embodiment of the system according to the invention, the sleeve and the shaft being depicted facing one another before assembly.

In the conventional way, a seal 27 is mounted on a tubular projection 22a of he casing 22 surrounding the shaft 14. The seal 27 has lips 28 designed to cooperate with the polished external peripheral surface 29 of the sleeve 15. In FIG. 2, chain line has been used to depict a bushing 30 which will be described in detail later.

According to the invention, the system 13 includes several elements.

On the shaft 14, a predetermined distance from the shoulder 51 and from the end face 31 thereof, at least one peripheral groove 32 is included comprising a bearing face 33 extending outward toward the free end 31 of the shaft 14.

On the sleeve 15, at least one internal peripheral slot is provided forming a chamber 34 formed in the internal peripheral wall 35 of the sleeve 15 and comprising a bearing face 40.

At least one wedge-forming element 36 can move more or less radially within the chamber 34 between a position retracted inside the chamber 34 (see FIG. 2) to allow the shaft 14 to be slipped into the sleeve 15 and a position partially protruding from said chamber in which said element 36 is designed to bear on the bearing face 33 of the groove 32 of the shaft 14 on the one hand, and on the bearing face 40 of the chamber 34 of the sleeve 15 on the other hand.

Means for making the moving wedge-forming element 36 move radially in one direction or the other, from outside the sleeve 15 is included.

The bearing faces 34 and 40 are oriented respectively in such a way that a more or less radially inward movement of the wedge-forming element 36 causes the sleeve 15 to be locked axially on the shaft 14.

In the example depicted, the groove 32 is a peripheral groove, which on the same side as the end face 31 of the shaft 14 has a tapering bearing face 33 that widens toward the outside in the direction of said end face 31, and each wedge-forming element 36 that will be described below as a key, comprises a face 44 designed to bear on the tapering face 33 of the groove 32.

As depicted in the figures, the splines 20 of the shaft 14 are interrupted by the groove 32 and extend on either side thereof. The groove 32 in the example depicted has a trapezoidal profile. The tapering faces 33 and 38 bounding the groove are cones, the axis of which is the axis 16 of the shaft 14, and the vertex angle A of which is approximately 60°. The groove 32 extends axially over a length that represents 20 to 50% of the length of the splines 20 of the shaft 14. The groove 32 has a depth which may advantageously exceed the height of the splines 20. The transverse plane of symmetry of the groove 32 lies axially preferably approximately ⅓ of the way along the length of the splines 20 starting from the end face 31 of the shaft 14. The sleeve or hub 15 of the constant-velocity joint 19 comprises, at a predetermined distance from the free end 17, a bulging part 39 inside which is formed the chamber 34 which has straight sides 40, 41 perpendicular to the common axis 16 of the sleeve 15 and of the shaft 14.

Each key 36 has a profile that complements that of the groove 32. As depicted in FIGS. 6a, 6b and 6c, each key 36 thus has an internal cylindrical surface 42 and an external cylindrical surface 43, an active tapering surface 44 designed to cooperate with the bearing face 33 of the groove 32, and an inactive tapering surface 45 designed to be placed facing the second tapering face 38 of the groove 32. The key 36 is bounded axially, in its housing 34, by two transverse flat sides 46 and 47. Although this is not indispensable, it may be advantageous to produce the keys 36 with dual symmetry in two mutually perpendicular planes, as depicted in FIGS. 6a, 6b and 6c.

The means for making each key 36 move from outside the sleeve 15 are screw means which will be described later, and which allow the key 36 to be locked radially between the tapering bearing face 33 of the groove 32, in contact with the active surface 44 of the key, and the straight side 40 of the chamber 34, in contact with the transverse flat side 46 of said key 36.

Each key 36 acts like a wedge the active faces of which are, on the one hand, the active tapering surface 44 bearing on the tapering bearing face 33 of the groove 32 and, on the other hand, the transverse flat side 46 bearing against the transverse flat side 40 of the chamber 34.

Figure 3:
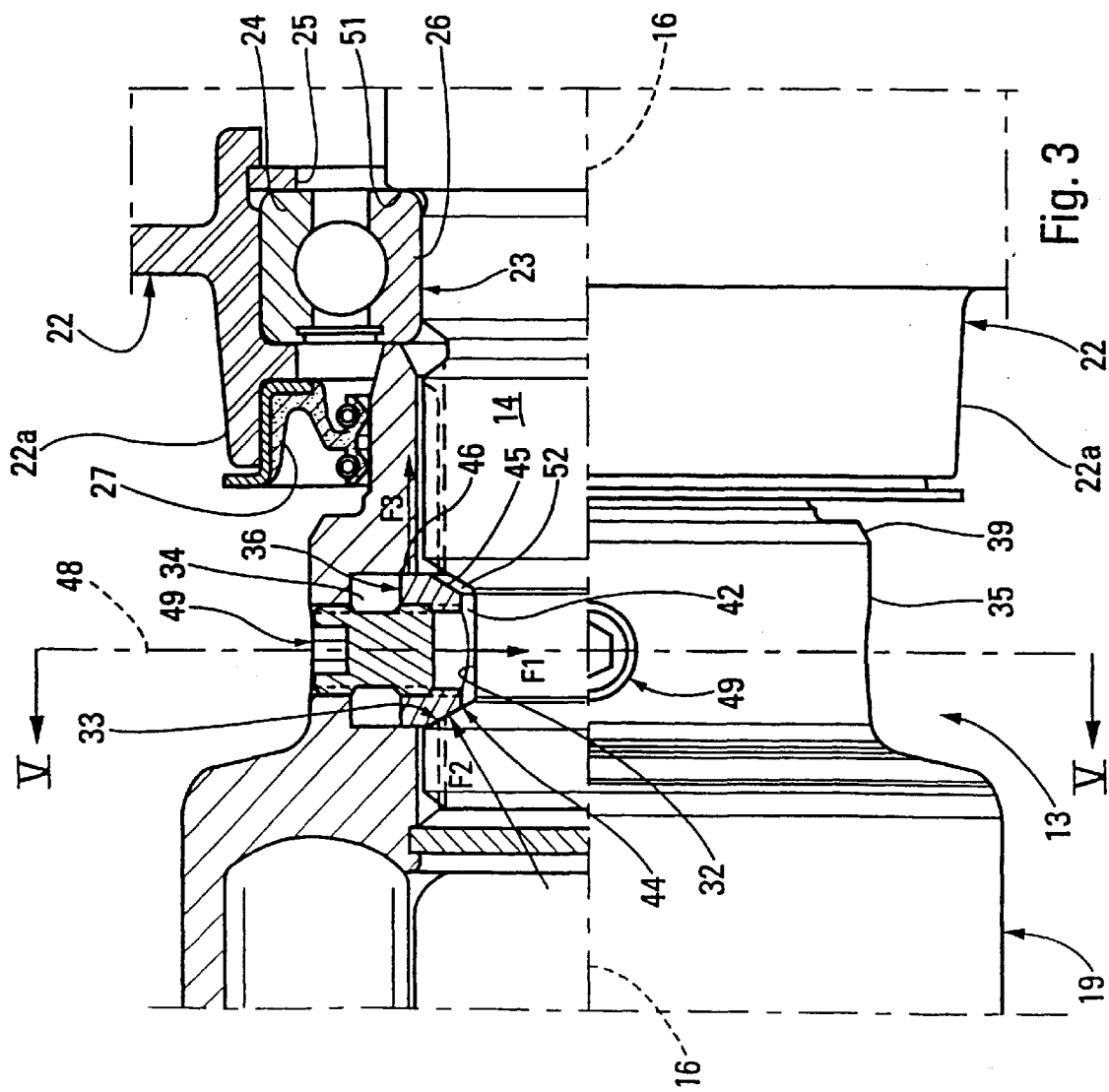
FIG. 3 is a view similar to FIG. 2, the sleeve being depicted in the position in which it is assembled on the shaft.
Figure 5:
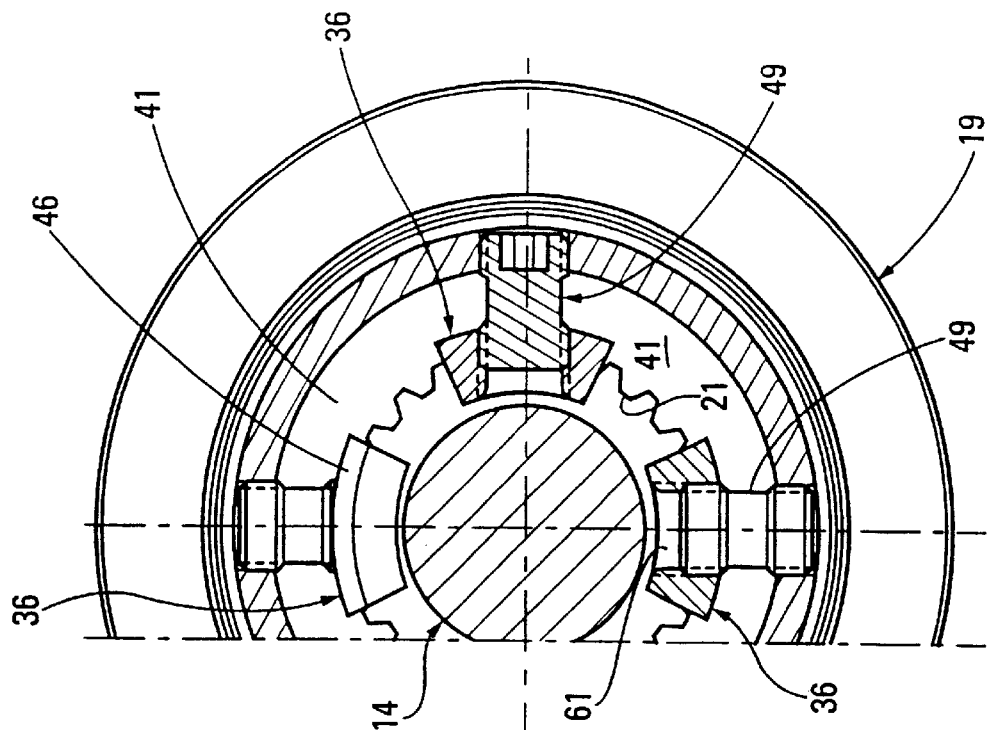
FIG. 5 is a part view in section similar to FIG. 4, taken along the lines V—V of FIG. 3 where the sleeve is assembled on the shaft.

As depicted in FIG. 3, when a key 36 is moved radially toward the axis 16, for example by screwing, this generates a radial force F1 directed toward the axis 16. The tapering surface 33 transmits to the tapering surface 44 a force F2 which lies in the plane of the figure. The lines of action of the forces F1 and F2 preferably meet on the common axis 48 of the key 36 and of the screw 49, approximately at the middle of the screw thread 50 (see later).

The composition of the forces F1 and F2 gives a resultant F3 parallel to the axis 16 and applied to the straight side 40 of the chamber 34, which axially forces the sleeve 15, the free end 17 of which finds itself pressed against the outer face 18 of the inner race 26 of the bearing 23. The inner race 26 locks itself against the shoulder 51 of the shaft 14. Thus the sleeve 15, the inner race 26 of the bearing 23 and the shaft 14 can be secured together perfectly.

The axial positioning of the transverse straight side 40 of the chamber 34 with respect to the end face 17 of the sleeve 15 on the one hand, and the axial positioning of the tapering bearing face 33 of the groove 32 with respect to the shoulder 51 of the shaft 14 on the other hand, need to be such that bearing in mind the axial width of the key 36 and that of the inner race 26 of the bearing 23, there is always some clearance 52 between the second tapering face 38, which is inactive, of the groove 32, and the corresponding inactive tapering surface 45 of the key 36, whatever the possible spread on machining exhibited by the axial succession that consists of the shaft 14, the sleeve 15, the key 36 and the bearing 23.

In other words, when locking the assembly, the tapering surface 38 of the groove 32 must never under any circumstances come into contact with the inactive tapering surface 45 of the key 36. The groove 32 must be deep enough that, bearing in mind the vertex angle of the tapering surfaces 33 and 38, it gives compensation for said machining spread. There must still be a radial clearance 53 between the lower cylindrical surface 42 of the key 36 and the bottom 54 of the groove 32 of the shaft 14.

Once the clearance 52 has been provided, the match between the inactive tapering surface 45 of the key 36 and the side 38 of the groove 32 may be approximate.

The tapering shape of the active tapering surface 44 of the key 36 needs to complement the shape of the tapering bearing face 33 of the groove 32 preferably for a position that corresponds to the keys 36 being pushed in to the minimum extent, bearing in mind the tolerances of the succession.

To make each key 36 move from outside the sleeve 15 using a screw 49, the chamber 34 has on its cylindrical internal peripheral surface 62, one or more, and in the example depicted, four, cylindrical drillings 55 opening radially to the outside and each being tapped 56 on its internal surface.

In the example depicted especially in FIG. 6d, the clamping screw 49 is a headless screw with two screw threads 57 and 58 separated by a middle undercut 59 that represents approximately one third of the total length of the screw 49. The two screw threads 57 and 58 are of opposite hand. The screw thread that runs in the normal direction, known as a right-hand thread, is preferably placed as the outermost screw thread 57, at that end of the screw 49 that engages with the tapping 56 of the drilling 55, and a screw thread known as the left-hand screw thread, is preferably placed as the innermost screw thread 58, at the innermost end of the screw 49 which engages with a complementary tapping known as a left-handed tapping 60 formed on the peripheral face of a hole 61 that passes through the key 36. This small screw-key subassembly can be standardized and produced by a manufacturer who specializes in threaded components, so that using it in various types of component and articulated joint does not require the machining of special left-handed internal and external threads.

Figure 4:
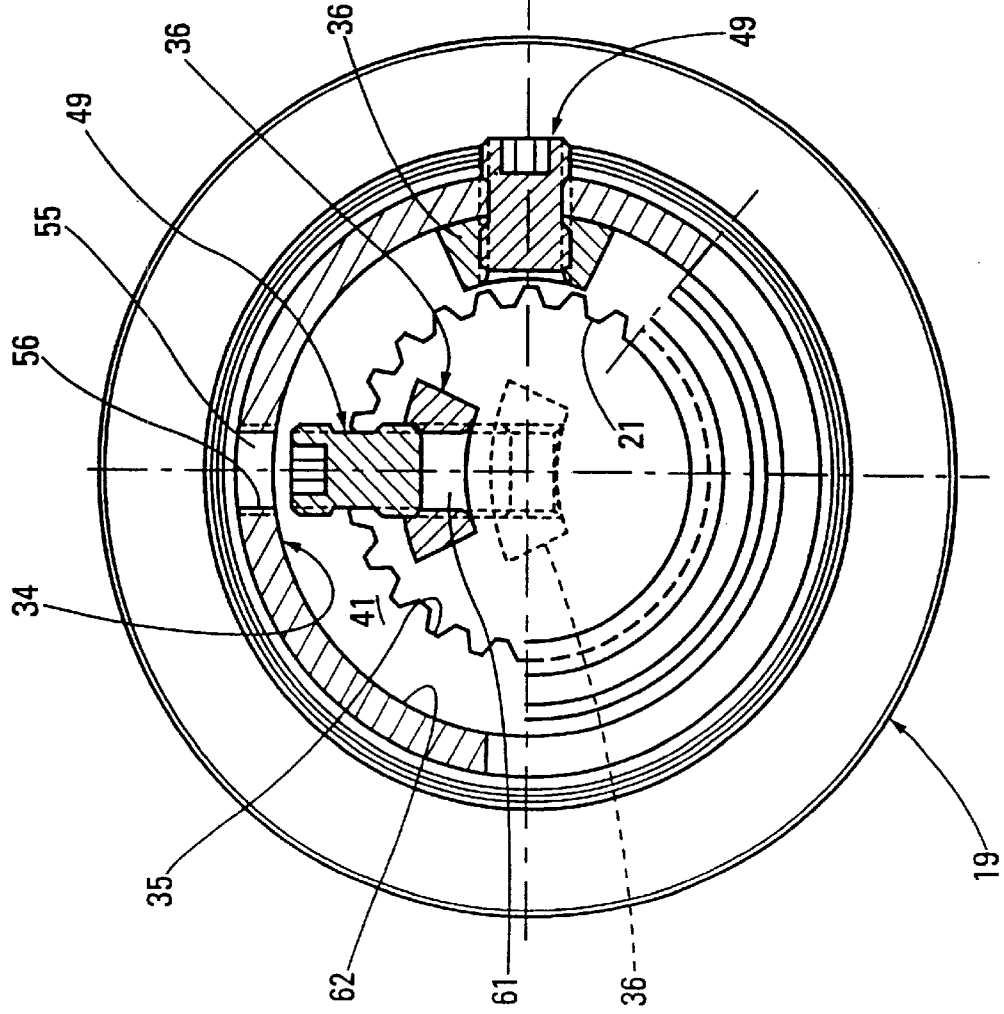
FIG. 4 is an end-on view partly in cross section taken along the lines IV—IV of FIG. 2, of the sleeve before positioning on the shaft, a key and its binding screw being depicted in succession in the position for insertion into the sleeve, in the position before the screw is screwed into the drilling in the sleeve, and in the position retracted in the chamber to allow the shaft to be introduced into the sleeve.

The key 36 and the screw 49 are inserted into the sleeve 15 in the position depicted in dashes in FIG. 4, the screw 49 being screwed fully into the key 36.

To bring the key into its retracted position depicted in FIG. 2 and in the right-hand part of FIG. 4, the screw 49 was offered up to the drilling 55 radially from the inside as depicted in solid line in the middle part of FIG. 4, then the screw 49 was turned to the left and its external screw thread 57 engaged with the tapping 56 of the drilling 55, while the innermost screw thread 58, engaging with the tapping 60 of the key 36, made the key 36 penetrate as far as the bottom of the chamber 34. In this position, the shaft 14 with its splines 20 can be inserted freely between the internal cylindrical surfaces 42 of the keys 36 until the end face 17 of the sleeve 15 butts against the outer face 18 of the inner race 26 of the bearing 23. At the same time, the polished external cylindrical surface 29 of the sleeve 15 is positioned beyond the lips 28 of the seal 27, as depicted in FIG. 3.

In order to firmly lock the assembly that consists of the sleeve 15, the shaft 14 and the bearing 23, all that is required is for the screws 49 to be driven to the right using an appropriate key. These screws sink down into the drilling 55 formed in the peripheral wall 35 of the sleeve 15 and come out of the keys 36, forcing these radially toward the axis 16 of the shaft 14.

In the embodiment depicted in FIGS. 7, 8, 9 and 10a to 10c, the key 65 has an untapped hole 66 and the screw 67 which cooperates with the key 65 is connected thereto in such a way that it can be secured to the key 65 both in tension and in compression, and in such a way that it can turn freely about the axis 48 with respect to it.

The screw 67 therefore has a single external screw thread 68 designed to engage with the tapping 56 of the drilling 55. Beyond the screw thread 68, the unthreaded shank 69 of the screw 67 passes through the hole 66 in the key 65. The shank 69 of the screw 67 thus has a riveted end 84.

Figure 10B:
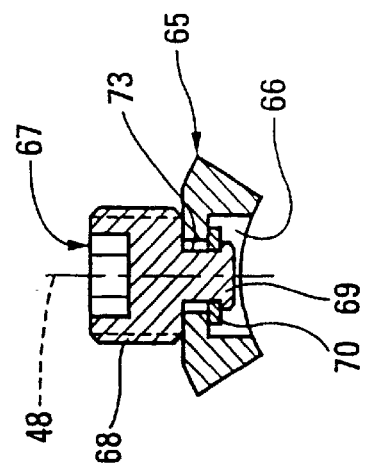
Figure 10C:
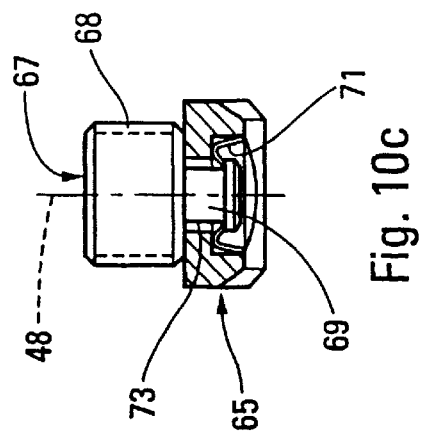

When assembling the system just described, the screw 67 holds the key 65 via a circlip 70 in the example of FIG. 10b, or via an elastic washer 71 with internal crenellations, in the example of FIG. 10c. In the example of FIG. 10a, a rivet 72 replaces the unthreaded shank 69 for connecting the screw 67 to the key 65. Any other known device may be used to replace the device of FIGS. 10a to 10c.

The shank 69 or the rivet 72 can also be used to set the keys 65 at uniform angular intervals about the axis 16. There is a clearance 73 between the shank 69 or the rivet 72 and the hole 66 in the key 65, in order to take up any defects in positioning, about the axis 16, of the tapped drillings 55 of the sleeve 15, of the transverse straight side 40 of the housing 34 and of the hole 66 in the key 65.

In the embodiment described hereinabove of FIGS. 2 to 6, it is not possible to form a clearance similar to the clearance 73. It is therefore necessary to ensure correct and satisfactory axial positioning of the axes 48 of the screws 49 with respect to the straight side 40 of each housing 34.

Introducing the subassemblies formed by a key 65 and its screw 67 into the splined sleeve 15 does not present any difficulties. All that is then required is for each screw 67 to be offered up to the corresponding tapped drilling 55, and for the screw 67 to be turned in the anticlockwise direction to bring the subassembly into its retracted position depicted in the right-hand part of FIG. 8. By turning the screw 67 in the correct direction, it is made to penetrate the groove 32 as far as the locked position depicted in FIG. 7 and in the external part of FIG. 8.

The screws 49, 67 are advantageously hexagon socket screws or screws with internal splines, but may be of some other type. Once locking has been achieved, these screws can be locked in place by punching or upsetting the edge of the threaded orifice or by any other known means.

The number of screw-key subassemblies to be provided depends on the desired axial locking force. Although a single key is sufficient for axially retaining a sleeve and a constant-velocity joint, it is highly preferable to envisage at least two keys so that the axial locking thrust can be spread over the entire surface 18 of the inner race 26 of the bearing 23 and over that of the shoulder 51 of the shaft 14 and thus perfectly secure together the sleeve 15 of the constant-velocity joint 19, the bearing 23 and the shaft 14.

Figure 11:
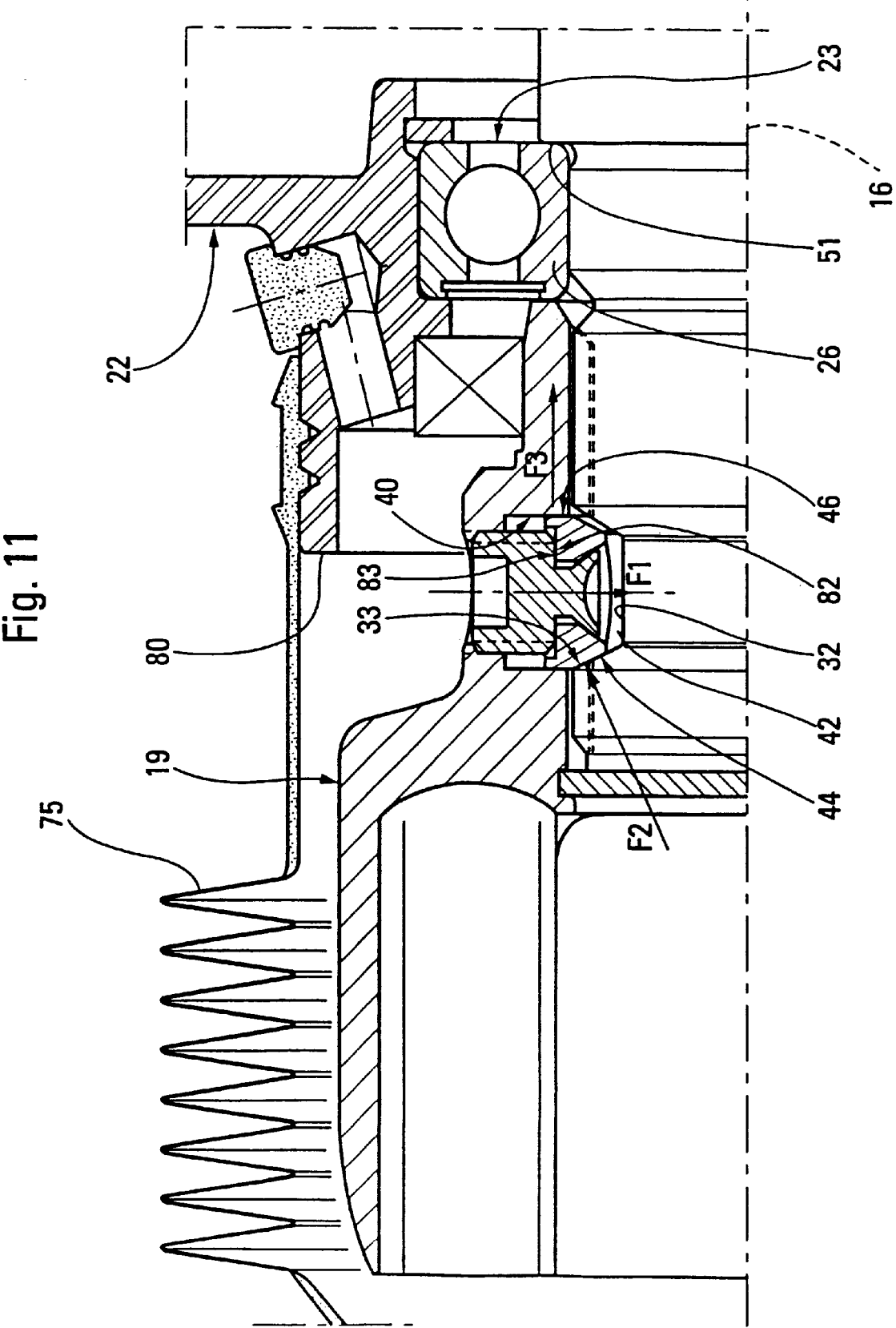
FIG. 11 is a view similar to FIG. 7 depicting a constant-velocity joint mounted on the output shaft and protected by a fixed boot.

In FIGS. 8, 9 and 11, the screws 67 apply a forceful radial thrust to the keys 65 via their inner face 82 bearing on the upper face 83 of the keys 65, these faces preferably being situated in line with the point where the lines of action of the forces F1, F2 and F3 meet.

In the embodiment depicted in FIG. 11, the constant-velocity universal joint is equipped with a fixed boot 75 which is mounted at its end on the same side as the shaft 14 on a tubular projection 80 surrounding said shaft 14 and which is equipped at its other end with a rotating seal between the boot 75 and the output shaft of the constant-velocity joint 19.

The constant-velocity joint 19 is equipped with a very reliable fixed boot 75, this solution being allowed by the compactness of the assembly achieved using the system according to the present invention.

The rotating seal between the boot 75 and the output shaft, not depicted, of the constant-velocity joint 19 may be achieved according to the embodiment depicted in FIGS. 6 and 7 of French Patent No. 91 13 390.

The compactness of the assembly according to the present invention also allows the use of a rotating semi-rigid boot 76 which may be of the type described in FIGS. 3 and 6 to 9 of French Patent No. 91 13 392, and depicted diagrammatically in chain line in FIG. 7.

A temporary seal may simply be produced between the casing 22 and the shaft 14 before the sleeve 15 and the constant-velocity joint 19 are assembled with said shaft, using a bushing 30 depicted schematically in chain line in FIG. 2 and depicted in detail in FIG. 12.

This bushing 30 is advantageously-molded from plastic and has a barrel 77 which penetrates beyond the lips 28 of the seal 27 as represented diagrammatically in FIG. 2, when the bushing is in place on the shaft 14.

At its other axial end, the bushing 30 comprises expanding tongues 78 bearing internal teeth 79 designed to press against the bearing face 33 of the groove 32 of the shaft 14.

The bearing face 81 of the bushing 30 thus comes into contact with the outer face 18 of the inner race of the bearing 23 to provide sufficient temporary sealing of the casing 22 while awaiting assembly of the constant-velocity joint with the shaft 14.

Of course the present invention is not restricted to the embodiments which have just been described, and numerous changes and modifications may be made to these without departing from the scope of the legal protection given to the present invention.

I claim:

1. A system for removably and mechanically locking a sleeve on a rotary drive shaft, said sleeve being designed to be slipped axially over said shaft and to be driven in rotation by said shaft, the system comprising:

mutually engaging first and second driving means on said sleeve and said shaft for said sleeve to be driven by said shaft;

means designed to bear on the shaft in order to press a free end of the sleeve axially against an element forming a stop integral with the shaft;

at least one peripheral groove comprising a first bearing face in the shaft, a predetermined distance away from an end face thereof;

at least one internal peripheral slot on the sleeve forming a chamber formed in the internal peripheral wall of the sleeve and comprising a second bearing face;

at least one wedge-forming element which has a first face and a second face and can be moved substantially radially within the chamber between a first position retracted inside the chamber to allow the shaft to be slipped into the sleeve and a second position partially protruding from said chamber in which said first face matingly engages the first bearing face of the groove of the shaft and said second face matingly engages the bearing face of the chamber of the sleeve;

means for moving the movable wedge-forming element substantially radially in one direction or the other, from outside the sleeve;

the bearing faces being oriented respectively in such a way that a substantially radially inward movement of the wedge-forming element causes the sleeve to be locked on the shaft.

2. The system as claimed in claim 1, wherein the shaft comprises a peripheral groove which on the same side as the end face of the shaft has a conical bearing face that widens toward the outside in the direction of said end face, and wherein each wedge-forming element has a conical face mating with said conical bearing face, and the cone angle of which corresponds to that of a radially external part of said conical bearing face.

3. The system as claimed in claim 1, wherein the bearing face of the chamber is flat and perpendicular to the axis of the sleeve and wherein each wedge-forming element comprises a flat face designed to bear against said flat bearing face.

4. The system as claimed in claim 1, wherein the means for moving each wedge-forming element from outside the sleeve are screw means.

5. The system as claimed in claim 4, wherein the chamber on its cylindrical internal peripheral surface includes a cylindrical, radial opening to the outside and being tapped on its internal surface, and wherein each wedge-forming element is secured to a screw member which on an external part of its external peripheral surface has a screw thread that complements the tapping.

6. The system as claimed in claim 5, wherein the screw member is connected to the wedge-forming element in such a way that it is secured to said wedge-forming element in the radial direction, and can be turned freely with respect to said element.

7. The system as claimed in claim 5, wherein the screw member on the internal part of its external peripheral surface on the same side as the wedgeforming element has a second internal screw thread of opposite hand to the screw thread on the external part of said member, and wherein the wedge-forming element has a radial drilling which has a tapping that complements said second screw thread.

8. The system of claim 1, wherein said first and second driving means are independent from said wedge-forming element.

9. The system of claim 8, wherein said first and second driving means comprise complimentary splines on said sleeve and on said shaft.

10. A constant-velocity universal joint comprising:
 a rotary drive shaft and a sleeve fixed to the end of said shaft by means of a system comprising means designed to bear on the shaft to press the free end of the sleeve axially against an element forming a stop integral with the shaft, the shaft and the sleeve including mutually engaging first and second driving members for said sleeve to be driven by said shaft;
 at least one peripheral groove comprising a first bearing face in the shaft, a predetermined distance away from the end face thereof;
 at least one internal peripheral slot on the sleeve forming a chamber formed in the internal peripheral wall of the sleeve and comprising a second bearing face;
 at least one wedge-forming element which has a first face and a second face and can be moved substantially radially within the chamber between a first position retracted inside the chamber to allow the shaft to be slipped into the sleeve and a second position partially protruding from said chamber in which said first face matingly engages the first bearing face of the groove of the shaft and said second face matingly engages the bearing face of the chamber of the sleeve;
 means for moving the movable wedge-forming element substantially radially in one direction or the other, from outside the sleeve;
 the bearing faces being oriented respectively in such a way that a substantially radially inward movement of the wedge-forming element causes the sleeve to be locked onto the shaft.

11. The constant-velocity universal joint as claimed in claim 10, further comprising a fixed boot which is mounted at the shaft end on a tubular projection surrounding said shaft and which is equipped at its other end with a rotating seal between the boot and the output shaft of the constant-velocity joint.

12. The constant-velocity universal joint as claimed in claim 11, including a semi-rigid rotating boot.

13. The universal joint of claim 10, wherein said first and second driving members are independent from said wedge-forming element.

14. The universal joint of claim 13, wherein said first and second driving members comprise complimentary splines on said sleeve and on said shaft.

15. The universal joint of claim 10, wherein the shaft comprises a peripheral groove which on the same side as the end face of the shaft has a conical bearing face that widens toward the outside in the direction of said end face, and wherein each wedge-forming element has a conical face mating with said conical bearing face, and the cone angle of which corresponds to that of a radially external part of said conical bearing face.

16. The universal joint of claim 10, wherein the bearing face of the chamber is flat and perpendicular to the axis of the sleeve and wherein each wedge-forming element comprises a flat face designed to bear against said flat bearing face.

17. The universal joint of claim 10, including a shoulder on said shaft and an inner race of a bearing mounted on the shaft between the shoulder on the shaft and an end face of the sleeve.

18. A rotary driveshaft comprising at least one peripheral groove having a bearing face near a free end face of said shaft and wherein said shaft protrudes out of a casing which has a seal designed to bear against a sleeve driven by the shaft, which shaft comprises, to ensure that the casing from which the driveshaft protrudes is sealed before the sleeve is assembled with said shaft, a bushing, the barrel of which is pushed in past the lips of the seal, the bushing at its other axial end having expanding tongues which have internal teeth designed to press on the bearing face of the shaft.

19. A sleeve for a constant-velocity universal joint, comprising:
 at least one internal peripheral slot forming a chamber formed in the internal peripheral wall of the sleeve and comprising a flat bearing face that is perpendicular to an axis of said sleeve;
 at least one wedge-forming element that can move substantially radially within the chamber between a first position retracted inside the chamber and a second position partially protruding from said chamber, the element comprising two bearing faces that are flat and designed to bear against said flat bearing face on said sleeve; and
 means for moving the movable wedge-forming element substantially radially in one direction or the other, from outside the sleeve.

20. A system for removeably and mechanically locking a sleeve on a rotary drive shaft, said sleeve being designed to be slipped axially over said shaft and to be driven in rotation by said shaft, the system comprising:
 means designed to bear on the shaft in order to press a free end of the sleeve axially against an element forming a stop integral with the shaft;

at least one peripheral groove comprising a bearing face on the shaft, a predetermined distance away from an end face thereof;

at least one internal peripheral slot on the sleeve forming a chamber formed in the internal peripheral wall of the sleeve and comprising a bearing face that is flat and perpendicular to the axis of the sleeve;

at least one wedge-forming element comprising a flat face designed to bear against said flat bearing face of the chamber, the wedge-forming element being moveable substantially radially within the chamber between a first position retracted inside the chamber to allow the shaft to be slipped into the sleeve and a second position partially protruding from said chamber in which a first face on the wedge-forming element matingly engages the bearing face of the groove and a second face of the wedge-forming element matingly engages the bearing face of the chamber of the sleeve;

means for moving the moveable wedge-forming element substantially radially in one direction or the other, from outside the sleeves;

the bearing faces being oriented respectively in such a way that a substantially radially inward movement of the wedge-forming element causes the sleeve to be locked on the shaft.

21. A system for removably and mechanically locking a sleeve on a rotary drive shaft, said sleeve being designed to be slipped axially over said shaft and to be driven in rotation by said shaft, comprising:

means designed to bear on the shaft in order to press a free end of the sleeve axially against an element forming a stop integral with the shaft;

at least one peripheral groove comprising a bearing face on the shaft, a predetermined distance away from an end face thereof;

at least one internal peripheral slot on the sleeve forming a chamber formed in the internal peripheral wall of the sleeve and comprising a bearing face;

at least one wedge-forming element which can move substantially radially within the chamber between a first position retracted inside the chamber to allow the shaft to be slipped into the sleeve and a second position partially protruding from said chamber in which said element is designed to bear, via a first face, on the bearing face of the groove of the shaft and, via a second face, on the bearing face of the chamber of the sleeve;

screw means for moving the movable wedge-forming element substantially radially in one direction or the other, from outside the sleeve;

the bearing faces being oriented respectively in such a way that a substantially radially inward movement of the wedge-forming element causes the sleeve to be locked on the shaft;

wherein the chamber on its cylindrical internal peripheral surface includes a cylindrical, radial opening to the outside and being tapped on its internal surface, and wherein each wedge-forming element is secured to a screw member which on an external part of its external peripheral surface has a screw thread that compliments the tapping; and wherein the screw member is connected to the wedge-forming element in such a way that it is secured to said wedge-forming element in the radial direction, and can be turned freely with respect to said element.

22. A system for removably and mechanically locking a sleeve on a rotary drive shaft, said sleeve being designed to be slipped axially over said shaft and to be driven in rotation by said shaft, comprising:

means designed to bear on the shaft in order to press a free end of the sleeve axially against an element forming a stop integral with the shaft;

at least one peripheral groove comprising a bearing face on the shaft, a predetermined distance away from an end face thereof;

at least one internal peripheral slot on the sleeve forming a chamber formed in the internal peripheral wall of the sleeve and comprising a bearing face;

at least one wedge-forming element which can move substantially radially within the chamber between a first position retracted inside the chamber to allow the shaft to be slipped into the sleeve and a second position partially protruding from said chamber in which said element is designed to bear, via a first face, on the bearing face of the groove of the shaft and, via a second face, on the bearing face of the chamber of the sleeve;

screw means for moving the movable wedge-forming element substantially radially in one direction or the other, from outside the sleeve;

the bearing faces being oriented respectively in such a way that a substantially radially inward movement of the wedge-forming element causes the sleeve to be locked on the shaft;

wherein the chamber on its cylindrical internal peripheral surface includes a cylindrical, radial opening to the outside and being tapped on its internal surface, and wherein each wedge-forming element is secured to a screw member which on an external part of its external peripheral surface has a screw thread that compliments the tapping; and wherein the screw member on the internal part of its external peripheral surface on the same side as the wedge-forming element has a second internal screw thread of opposite hand to the screw thread on the external part of said member, and wherein the wedge-forming element has a radial drilling which has a tapping that compliments said second screw thread.

23. A constant-velocity universal joint comprising:

a rotary drive shaft and a sleeve fixed to the end of said shaft by means of a system comprising means designed to bear on the shaft to press the free end of the sleeve axially against an element forming a stop integral with the shaft;

at least one peripheral groove comprising a bearing face on the shaft, a predetermined distance away from the end face thereof;

at least one internal peripheral slot on the sleeve forming a chamber formed in the internal peripheral wall of the sleeve and comprising a bearing face;

at least one wedge-forming element which can move substantially radially within the chamber between a first position retracted inside the chamber to allow the shaft to be slipped into the sleeve and a second position partially protruding from said chamber in which said element is designed to bear, via a first face, on the bearing face of the groove of the shaft and, via a second face, on the bearing face of the chamber of the sleeve;

means for moving the movable wedge-forming element substantially radially in one direction or the other, from outside the sleeve;

the bearing faces being oriented respectively in such a way that a substantially radially inward movement of the wedge-forming element causes the sleeve to be locked onto the shaft; and a fixed boot that is mounted at the shaft end on a tubular projection surrounding said shaft and which is equipped at its other end with a rotating seal between the boot and the output shaft of the constant-velocity joint.

24. A constant-velocity universal joint as claimed in claim 23, including a semi-rigid rotating boot.

* * * * *